E. C. PATTERSON.
COMBINATION MEASURING IMPLEMENT.
APPLICATION FILED JAN. 9, 1908.
912,607.
Patented Feb. 16, 1909.
2 SHEETS—SHEET 2.
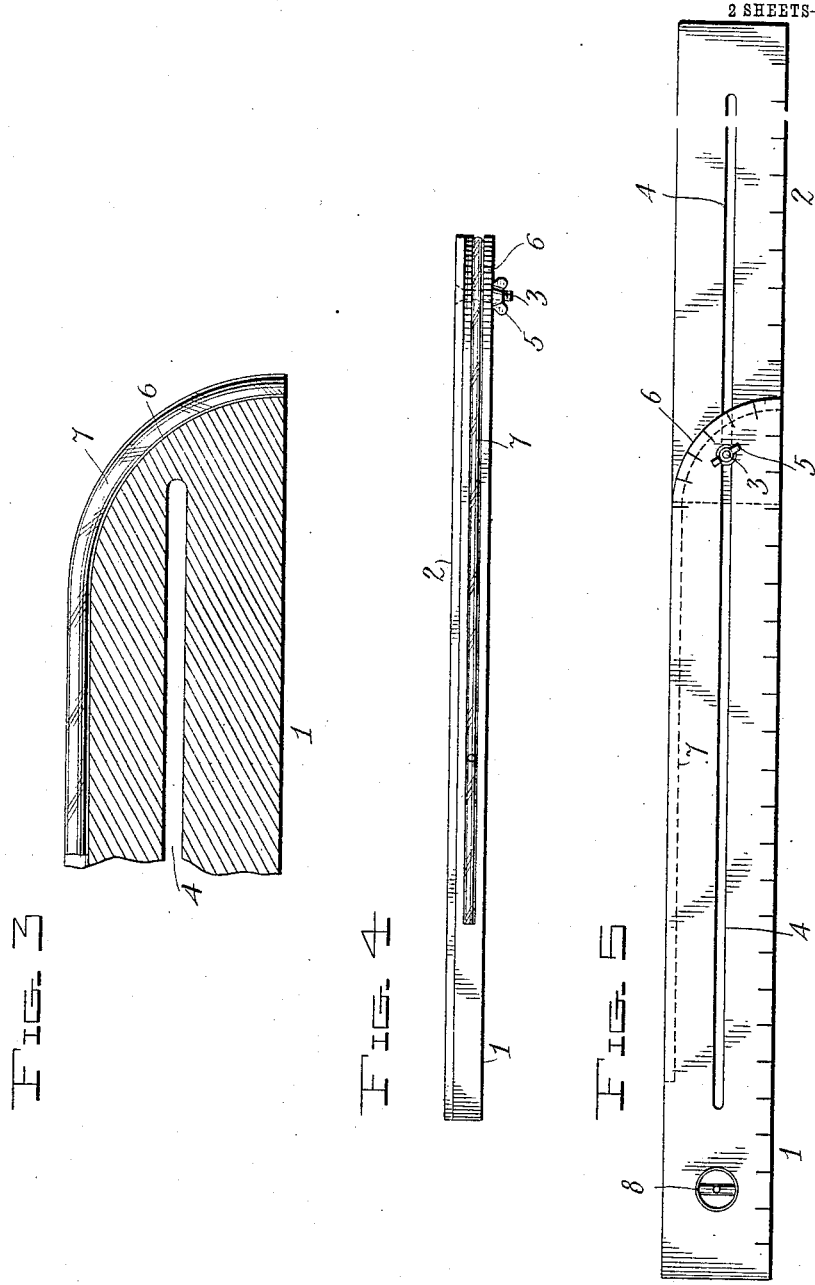
Witnesses
Inventor
Earl C. Patterson
By Chandler & Chandler
Attorneys

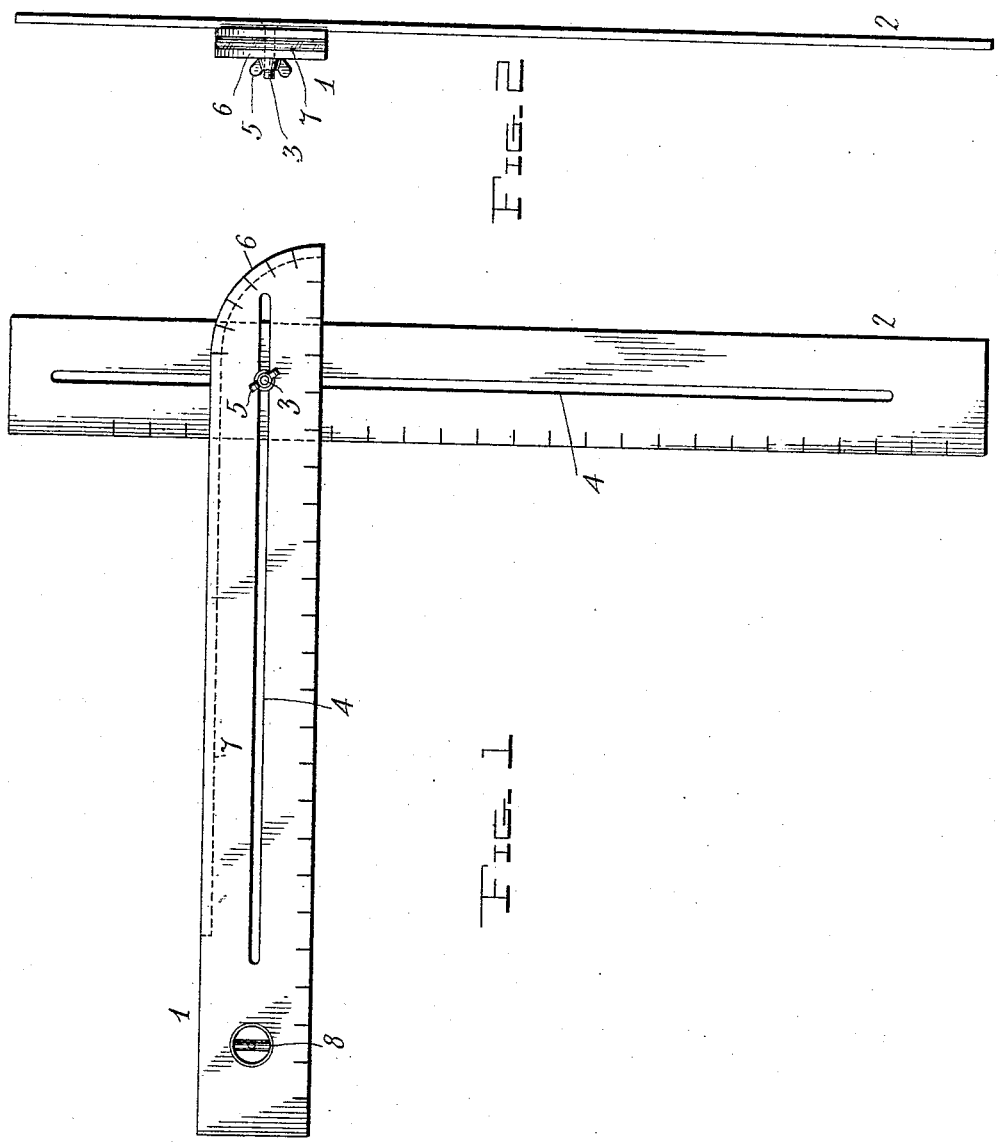

UNITED STATES PATENT OFFICE.

EARL C. PATTERSON, OF MOORE, OKLAHOMA.

COMBINATION MEASURING IMPLEMENT.

No. 912,607.　　　　Specification of Letters Patent.　　　Patented Feb. 16, 1909.

Application filed January 9, 1908. Serial No. 410,033.

*To all whom it may concern:*

Be it known that I, EARL C. PATTERSON, a citizen of the United States, residing at Moore, in the county of Cleveland, Oklahoma, have invented certain new and useful Improvements in Combination Measuring Implements; and I do hereby declare the following to be a full, clear, and exact description of the invention, such as will enable others skilled in the art to which it appertains to make and use the same.

The present invention relates to measuring implements and it aims, primarily, to provide an exceedingly simple, inexpensive, and effective measuring implement in which a level, a bevel, and a square are combined in a single structure, thus rendering it possible to readily convert the device into any one of the implements above mentioned and to utilize it as such in the ordinary manner.

More especially, however, the invention resides in the provision of a combination measuring implement in which that member which serves as the level carries at one end an arcuate glass spirit tube by means of which the pitch of a rafter may be determined and the rafter then sawed accordingly.

The invention will be readily understood from a consideration of the following detailed description and its preferred embodiment is illustrated in the accompanying drawings in which corresponding parts or features, as the case may be, are designated by similar reference numerals in the several views.

Of the said drawings:—Figure 1 is a front elevation of the implement illustrating the position of the members thereof when utilized as a square. Fig. 2 is a side elevation thereof. Fig. 3 is a fragmental longitudinal section through the bevel. Fig. 4 is a plan view of the implement with the members thereof folded together. Fig. 5 is an elevation of the implement with the members thereof extended to form a rule.

As shown in said drawings, the implement comprises two members 1 and 2 adjustably connected with each other by a bolt 3, each member being provided with a longitudinal slot 4, said slots intersecting each other so as to permit the passage of the bolt 3 therethrough, the projecting threaded end of the bolt carrying a thumb-nut 5 adapted to be tightened against the adjacent face of the member 1 to effect the retention of said members in adjusted position with respect to each other.

By reason of the formation of the slots 4, the members of the implement may be set at any desired angle to each other in order to permit the implement to be used as an ordinary square or as a T-square, as well as in the production of obtuse and acute bevels. The members of the implement may likewise be extended into alinement with each other so as to permit the use of the implement as a rule, the faces of said members being calibrated for this purpose. It is also possible to fold said members together as shown in Fig. 4 in which position the implement occupies but little space and may be carried in the pocket. As originally stated, however, the invention resides primarily in the adaptability of the implement to accurately determine the proper bevel for the rafters of a roof having a definite pitch, the bevel varying according to the length of the rafters, as is obvious. To this end, the member 1 which serves as the level, has one end thereof cut to form an arc of 90°, as designated by the numeral 6, such end being calibrated to indicate the fractions of said arc. The upper face of said member is channeled longitudinally for the reception of the tube 7 of a spirit level, such channel extending completely across the curved portion 6 and terminating at the bottom face of said member, the tube being likewise extended to such point and curved so as to fit in the arcuate extension of the channel. Owing to this construction, and to the fact that a definite proportion (*i. e.*, 1 to 12, or inches to feet), exists between the distances indicated by the calibrations on the members of the implement and the actual dimensions to be observed, it will be apparent that the members may be adjusted at the proper point and the thumb-nut partially tightened to prevent displacement of the members from such position, after which the member 1 may be tilted upon the bolt 3 until the required pitch is indicated by the bubble in the curved portion of the tube 7, whereupon the tightening of the nut is completed. For example, where it is desired to use an 8 foot rafter for a half-pitch roof (*i. e.*, a roof having a slant of 45°), the members are first adjusted by moving the bolt to the corresponding point in the slot in the member 1, after which the thumb-nut is partially tightened; the lower end of the member 2 is then rested upon a level surface and the member 1 then tilted upon the bolt until the bubble in the tube 7 moves into the curved portion thereof and reaches the required point therein, whereupon the tightening of the thumb-nut is completed, thus producing the necessary bevel.

The end of the member 1 opposite the curved end thereof is provided with an ordinary vertical level 8 set into the outer side face of such member, while the body portion of the tube 7 likewise serves as a horizontal level, as will be understood.

What is claimed is:—

A measuring implement comprising a longitudinally-slotted supporting member, a longitudinally-slotted member provided with a calibrated quadrant-shaped end, and with a channel formed in the face of said end, a bolt passing through said slots for adjustably connecting said members together, and a spirit-level fitted in said channel and conforming to the shape thereof.

In testimony whereof, I affix my signature, in presence of two witnesses.

EARL C. PATTERSON.

Witnesses:
C. H. BESSENT,
WM. SYNNOTT.